US008150950B2

(12) United States Patent
McQuillan et al.

(10) Patent No.: US 8,150,950 B2
(45) Date of Patent: Apr. 3, 2012

(54) AUTOMATED DISCOVERY OF DEVICES IN LARGE UTILITY MONITORING SYSTEMS

(75) Inventors: Jayme McQuillan, Murfreesboro, TN (US); Jon A. Bickel, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 251 days.

(21) Appl. No.: 12/152,255

(22) Filed: May 13, 2008

(65) Prior Publication Data
US 2009/0287803 A1    Nov. 19, 2009

(51) Int. Cl.
*G06F 15/173* (2006.01)
(52) U.S. Cl. .................. 709/222; 709/224; 702/61
(58) Field of Classification Search .......... 709/222, 709/224; 702/61
See application file for complete search history.

(56) References Cited

U.S. PATENT DOCUMENTS

| 6,013,108 | A * | 1/2000 | Karolys et al. ............ 702/189 |
| 6,233,626 | B1 * | 5/2001 | Swales et al. .............. 710/11 |
| 6,751,727 | B1 * | 6/2004 | Cook et al. ................. 713/1 |
| 6,799,204 | B1 * | 9/2004 | Baba et al. ................ 709/220 |
| 7,272,518 | B2 | 9/2007 | Bickel et al. .............. 702/61 |
| 2002/0188759 | A1 * | 12/2002 | Roy et al. ................. 709/245 |
| 2003/0033389 | A1 * | 2/2003 | Simpson .................... 709/220 |
| 2003/0084112 | A1 * | 5/2003 | Curray et al. .............. 709/208 |
| 2003/0112765 | A1 * | 6/2003 | Gaspard et al. ............ 370/252 |
| 2003/0151513 | A1 * | 8/2003 | Herrmann et al. .......... 340/573.1 |
| 2004/0128146 | A1 | 7/2004 | Williams et al. ........... 705/1 |
| 2005/0027832 | A1 * | 2/2005 | Bavaria et al. ............. 709/220 |
| 2006/0161400 | A1 | 7/2006 | Kagan |
| 2007/0005277 | A1 * | 1/2007 | Bickel et al. .............. 702/61 |
| 2007/0262863 | A1 * | 11/2007 | Aritsuka et al. .......... 340/539.22 |

FOREIGN PATENT DOCUMENTS
WO    2007/005549 A1    1/2007

OTHER PUBLICATIONS

"Transparent Ready Products, Web-enabled Power and Control: Navigate freely across a universal network", Telemecanique, Jun. 2006, whole document, accessed <http://static.schneiderelectric.us/docs/Automation%20Products/Transparent%20Ready%20-%20Automation/MKTED205102EN-US.pdf.>.*
Written Opinion corresponding to co-pending International Patent Application Serial No. PCT/US2009/043408, European Patent Office; dated Feb. 23, 2010; 5 pages.

(Continued)

*Primary Examiner* — Thomas Dailey

(57) ABSTRACT

An auto-discovery algorithm attempts a scattered-read of register addresses of a device in a utility monitoring system whose identity is unknown to a computer system. If the scattered read is successful, and data from the device includes a device ID code that is matched against a lookup table of devices. If unsuccessful, the algorithm attempts a block-read, and if unsuccessful, iteratively checks each register against the lookup table to determine whether a match exists until either one is found or the device reports an illegal data address exception, whereupon the algorithm stops attempting to read from subsequent addresses. The algorithm analyzes the response from the communications driver of the computer system to determine whether the response is valid, and if not, what type of exception is reported. If a timeout occurs, the algorithm flags the device for a later retry scan, and moves on to attempt to discover the next device.

9 Claims, 3 Drawing Sheets

OTHER PUBLICATIONS

International Search Report corresponding to co-pending International Patent Application Serial No. PCT/US2009/043408, European Patent Office; dated Feb. 23, 2010; 3 pages.

DEC Data Systems: "DEC Data Systems—DataWise Manual" May 6, 2006, XP002470188, p. 5-p. 6, p. 58-60, p. 129.

Don Landing et al.: "Sensor Data Analysis Framework Research Roadmap—Integrating Stream Processing and Persistent Data Retrieval", Feb. 2006, XP002470189, the whole document.

Harrison M: "EPC Information Service—Data Model and Queries" Internet Citation, Oct. 1, 2003, XP002355668, the whole document.

Gehrke J et al: "Sensor and Actuator networks—Query processing in sensor networks" IEEE Pervasive Computing, IEEE Service Center, Los Alamitos, CA, US, vol. 3, No. 1, Jan. 2004, pp. 46-55, XP0011108155, the whole document.

Bonnet P et al: "Querying the Physical World" IEEE Personal Communications, IEEE Communications Society, US, vol. 7, No. 5, Oct. 2000, pp. 10-15, XP000966619, the whole document.

Ledlie J et al: "Provenance-Aware Sensor Data Storage" Data Engineering Workshops, 2005, 21st International Conference on Tokyo, Japan Apr. 5-8, 2005, Piscataway, NJ, USA, IEEE, Apr. 5, 2005, pp. 1189-1189, XP010924091, the whole document.

Kevin Chang et al: "SensorBase.org—A Centralized Repository to Slog Sensor Network Data" Center for Embedded Network Sensing. Papers. Paper 116, May 5, 2006, XP002470190, the whole document.

Written Opinion corresponding to co-pending International Patent Application Serial No. PCT/US2007/011247, European Patent Office, dated May 15, 2008, 12 pages.

International Search Report corresponding to co-pending International Patent Application Serial No. PCT/US2007/011247, European Patent Office, dated May 15, 2008, 8 pages.

\* cited by examiner

AUTOMATED DISCOVERY OF DEVICES IN LARGE UTILITY MONITORING SYSTEMS

FIELD OF THE INVENTION

This invention is directed generally to auto-discovery of devices, and, more particularly, to auto-discovery of utility monitoring devices in a utility monitoring system.

BACKGROUND OF THE INVENTION

A utility monitoring system may include utility monitoring devices capable of communicating data to a central computer system that receives the data for storage, analyses or reporting. The central computer system must learn the identity of all of the utility monitoring devices so that it can approve receipt of their monitored data and to know where to go within a known device to find specific data. For example, the A-phase rms voltage may be located in one register in one device and an entirely different register in another device. Knowing the device identity allows the central computer system to also know the device's register layout configuration from a known library of register lists and thereby access the data stored in the device's registers quickly and accurately.

Minimizing the time required to discover the device identities is very important because the communications network connecting all the utility monitoring devices needs bandwidth to carry out other important tasks related to the utility monitoring system and other ancillary systems. However, due to the nature of certain utility monitoring systems, a number of factors can cause the auto-discovery process to be extremely slow. First, some utility monitoring systems use a simple serial communications protocol to communicate device data to the central computer system. Although the serial communications protocol may eventually communicate data over a faster one, such as Ethernet, response times are limited by the most restrictive communications pipe in the utility monitoring system. Moreover, the larger the utility monitoring system (e.g., over 1000 nodes or devices and over 200 unique IP addresses), network congestion becomes a more significant problem. If it takes 24 hours or even longer to auto-learn the identities of devices present in the utility monitoring system, such a delay may be considered unacceptable and potentially unsafe. As devices are added or removed, the central computer system must quickly be able to learn new device identities and discard old ones, otherwise efficiency is lost.

Thus, a need exists for an improved apparatus and method to quickly ascertain the devices located on a utility monitoring system. The present invention is directed to satisfying one or more of these needs and solving other problems.

SUMMARY OF THE INVENTION

An auto-discovery algorithm interprets and analyzes data received from a communications driver of a central computer system and makes decisions based on the interpretation. The analysis includes the response time of the electrical node, the type of response received (either from the node or from the communications driver), and the identities of the electrical nodes who have been discovered in the utility monitoring system.

The algorithm attempts a scattered read of the device under consideration to evaluate multiple identification registers in one read, wherein at least some of the multiple identification registers do not have consecutive addresses. If successful, the algorithm compares the returned values from the device against a lookup table in the central computer in order to establish whether these returned values match an established device identification code. If a match is not found, the algorithm attempts another scattered read with a different set of addresses. Once a match is found, the algorithm can adjust which set of addresses it tries on the next scattered read for the next device to increase the chance that a match will be found on the first subsequent scattered read.

If a scattered read is unsuccessful (because, for example, the device does not support such an operation or the device has reported an exception), the algorithm attempts a block read of the device to scan for multiple identification registers having consecutive addresses in one read operation and compares any values returned from the device against a lookup table. If a match is not found, the algorithm continues to attempt to block read blocks of register until the device is identified. Once a match is found following a block read request, the algorithm can adjust which starting address it tries first on the next block read to increase the chance that a match will be found on the first subsequent block read for the next device. If a match is found during a scattered or block read operation, the algorithm stops checking for matches and optionally flags the number of attempted reads it took to find a match along with the address of the register where a match was found.

If the scattered and block read attempts fail, it is assumed that the device does not support scattered or block read operations, and the algorithm will request data from the device's registers on a register-by-register basis, checking each register's data against a lookup table of device identification information.

Some devices may store a predetermined value in their reserved registers, such as −32768, and these reserved registers may be scattered throughout the device's register map. The algorithm may optionally be programmed to recognize this predetermined value and continue attempting to scatter or block read from the device's registers. However, if the device does not store any predetermined values in reserved registers and the algorithm attempts to read from one of the reserved registers, the device will send an exception response. In such case, the algorithm may optionally be programmed with a list of common reserved register addresses, and can read around these reserved registers when an exception is received.

When a response is received, the algorithm determines the type of the response and the time elapsed for the communication. When a timeout response, corrupt data, or other error is received, the algorithms skips any additional scans or read attempts for the device under consideration. The timeouts or errors may be reported to the end-user and the algorithm flags the device to be rescanned at a later time (e.g., when the communication paths are less congested, when the device is operational, etc.).

The algorithm may optionally scan for only devices known to be in the utility monitoring system, greatly reducing the number of packets to be sent and received between the central computer system and the device. The algorithm learns the utility monitoring system and scans for the most common devices first by reprioritizing the scan priority list after each successful device identification using statistical probabilities. In addition, the algorithm fine tunes each device or device type by changing each device or device type timeout instead of applying a global timeout to all devices. Adjusting timeouts is also useful for the operation of the utility system after it is configured. Thus, for devices with shorter timeout periods, the algorithm does not have to poll longer than necessary to ascertain that a timeout has occurred for those faster devices.

The algorithm significantly increases the efficiency of the auto-discovery process of a utility monitoring system, particularly large utility monitoring systems that may include hundreds of nodes and hundreds of device addresses.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings, in which.

DETAILED DESCRIPTION OF THE ILLUSTRATED EMBODIMENT

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention as defined by the appended claims.

Figure 1:
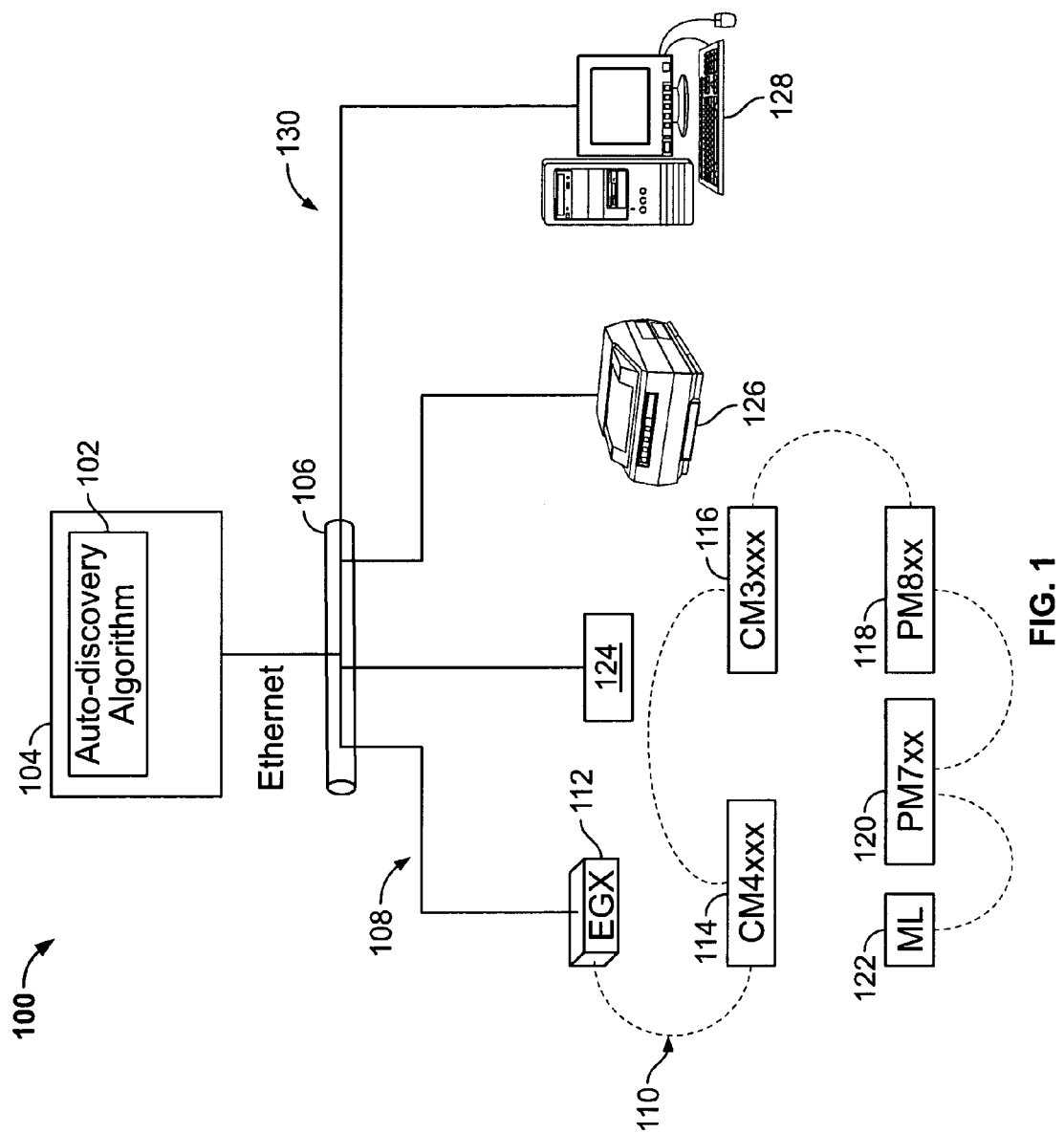
FIG. 1 is a functional block diagram of an exemplary utility monitoring system that includes an auto-discovery algorithm according to aspects disclosed herein.

Referring now to the drawings, and initially to FIG. 1, an exemplary utility monitoring system 100 is shown. The monitoring system 100 may be any system that monitors measurable characteristics of a utility. The utility being monitored in the monitoring system 100 can be any of the five utilities designated by the acronym WAGES, or water, air, gas, electricity, or steam. In the illustrated example shown in FIG. 1, the utility is electricity, though aspects disclosed herein apply equally to any of the other four utilities. The utility monitoring system 100 is typically arranged in a hierarchy with intelligent electronic devices (IEDs) 114, 116, 118, 120, 122, 124 installed at various levels of the hierarchy, and data from these IEDs is communicated through various means to a central computer system 104. The central computer system 104 may include any number of computer and/or server components. Some IEDs can be utility monitoring devices, which measure various characteristics of the electrical signal (e.g., voltage, current, waveform distortion, power, etc.) passing through the conductors, such as a PowerLogic® Series CM3xxx/CM4xxx Circuit Monitor 114, 116 available from Schneider Electric based in Palatine, Ill., or a PowerLogic® Series PM7xx/8xx Power and Energy Meter 118, 120, or a PowerLogic® ION7550/7650 Power and Energy Meter. A few other examples of IEDs include a Micrologic® Trip Unit 122, or a microprocessor-based circuit breaker, or a relay. In the case of a different type of utility, the IEDs may be flow rate meters.

The IEDs 114, 116, 118, 120, 122 are connected in series communication with a gateway 112, such as a PowerLogic® EGX400 Ethernet Gateway. The IED 114 is connected over an RS-485 connection 110 and communicates data according to a Modbus® ("Modbus") TCP/IP serial communications protocol to the gateway 112. The central computer system 104 is connected to an Ethernet network 106. Devices may be coupled to the Ethernet network to create Ethernet connections 108, 130 to the gateway 112 and to a personal computer 128 equipped with a suitable Ethernet card, respectively, for example. Additional devices may be coupled to the Ethernet network 106, such as an Ethernet-capable printer 126 or an Ethernet-capable IED, such as one equipped with a PowerLogic® ECC21 Ethernet Communication Card or PM8ECC.

The gateway 112 converts data between the Modbus TCP/IP protocol and an Ethernet protocol, such as defined in the IEEE 802.3 standard. The IEDs 114, 116, 118, 120, 122 are connected to one another and to the gateway 112 serially. The central computer system 104 includes a memory for storing an auto-discovery algorithm 102, discussed in more detail in connection with FIG. 2. The devices 114, 116, 118, 120, 122, 124, 126, 128 may be generally referred to herein as "nodes." The devices may include a memory whose locations are addressable by memory addresses. This memory may be referred to herein as a register memory. One or more of the memory locations includes identification information indicative of an identity of the device. The identification information may be an identification code (ID code) that uniquely identifies the type of device so that it can be differentiated from other types of devices. For example, one ID code might indicate that the device is a PowerLogic® Series CM4000 Circuit Monitor 114, and all such circuit monitor devices include the same ID code. Another ID code, which is different for the code for this circuit monitor, might indicate that the device is a PowerLogic® PM800 Power and Energy Meter 118, and all such power meters include this same ID code. Each device also has a unique device address, which is used by the central computer system 104 or the gateway 112 to communicate with the device. Once a device's identification is known, it is readily apparent that the device's capabilities are then also known as discussed above. Because some device capabilities are added through subsequent firmware revisions, the algorithm 102 can determine any limitations of the device based upon its current firmware revision. The following Table 1 sets forth a non-exhaustive list of exemplary devices, the address of the register containing the identification code for each device, and the value of the identification code uniquely identifying each device. It should be emphasized that the information set forth in the Table 1 below is merely exemplary and other aspects may include numerous additional device types, including device types offered by different manufacturers.

TABLE 1

| Device Type Description | Device Identification Register Address | Device ID Code |
|---|---|---|
| PM9C | 64648 | 15198 |
| PM500 | 64648 | 50980 |
| PM710 | 7004 | 15165 |
| PM750 | 7004 | 15202 |
| PM810 | 3011 | 15210 |
| PM820 | 3011 | 15211 |
| PM850 | 3011 | 15212 |
| Micrologic | 515 | 15139 |
| Micrologic | 515 | 15140 |
| Micrologic P | 8716 | 15133 |
| Micrologic H | 8716 | 15135 |
| PM210 | 7004 | 15201 |
| ION6200 | 13 | 6200 |
| MC08 | 64649 | 12344 |
| MC09 | 64649 | 12345 |
| MC18 | 64649 | 12600 |
| PM870 | 3011 | 15213 |
| Enercept Enhanced | 30 | 15022 |
| Enercept Basic | 30 | 15023 |
| Micrologic A | 8716 | 15131 |
| Argos Type A | 8716 | 15143 |
| Argos Type E | 8716 | 15144 |

TABLE 1-continued

| Device Type Description | Device Identification Register Address | Device ID Code |
|---|---|---|
| Scout | 36 | 18000 |
| CM4000 | 3011 | 15101 |
| CM4150 | 3011 | 15102 |
| CM4250 | 3011 | 15103 |
| CM4350 | 3011 | 15104 |
| CM4000T | 3011 | 15101 |
| CM3250 | 3011 | 15111 |
| CM3350 | 3011 | 15112 |
| XA4W | 3011 | 15200 |

Figure 2A:
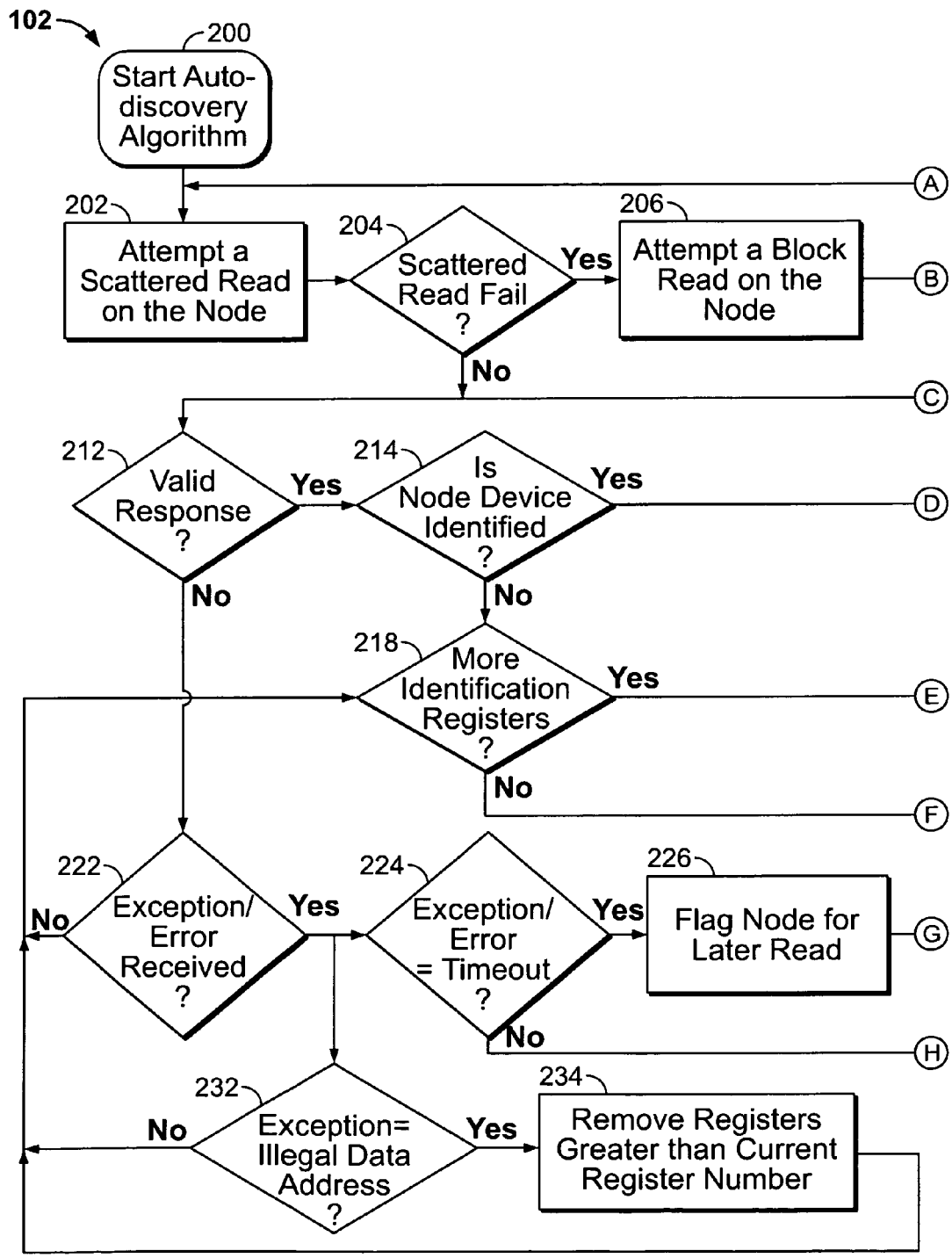
FIGS. 2A-B are a flow chart diagram of the auto-discovery algorithm.
Figure 2B:
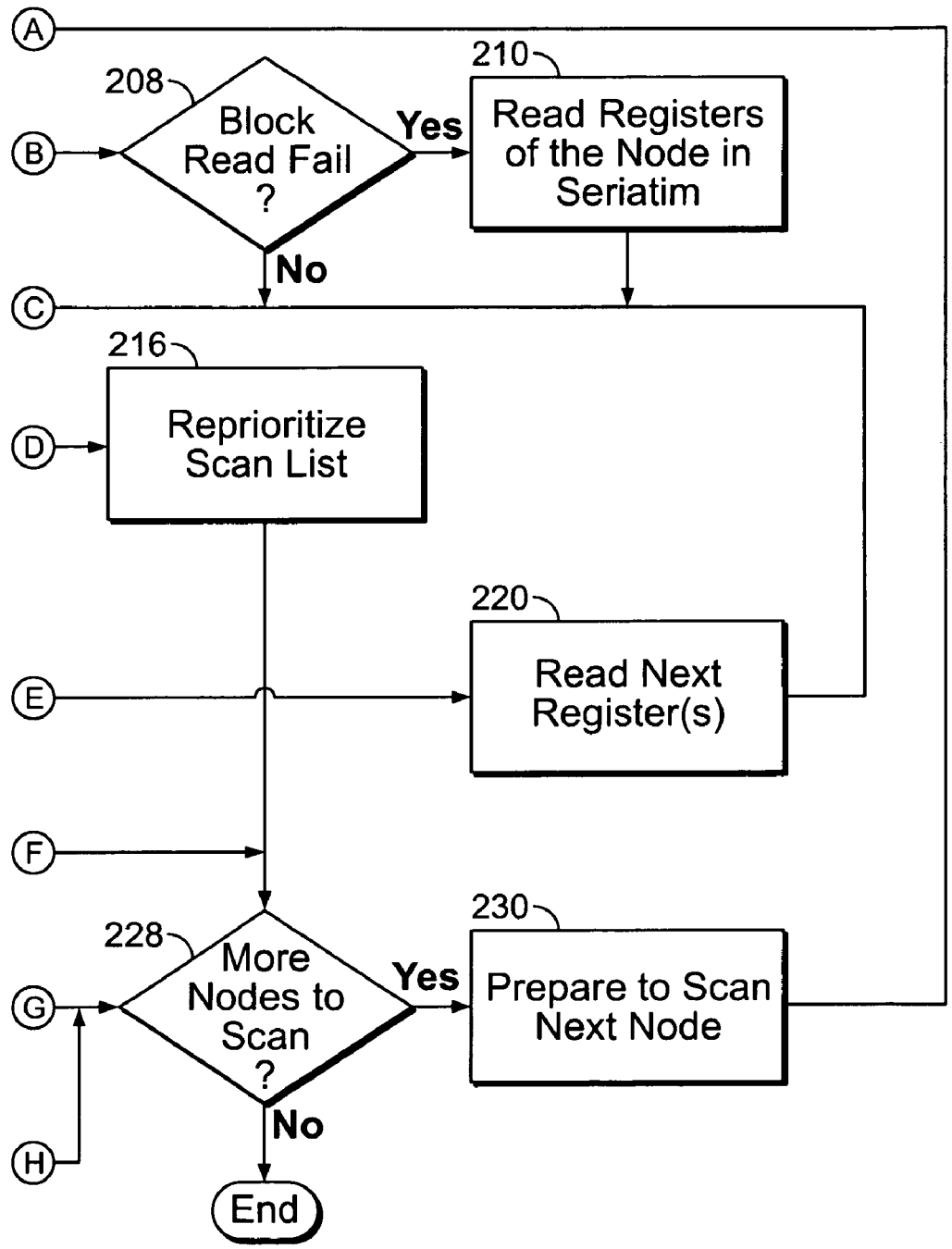

FIGS. 2A and 2B are a flow chart diagram of the auto-discovery algorithm 102. The algorithm 102 communicates with a conventional communications driver in the central computer system 104, and the communications driver communicates with the capable devices in the utility monitoring system 100. Upon starting the auto-discovery algorithm 102 (200), the algorithm 102 attempts to scattered read a predetermined number of registers in the node under consideration (202). A scattered read is a memory read operation in which multiple addresses, some of which are non-consecutive, are read from a memory. By consulting a device list like the aforementioned Table 1, the algorithm 102 can target specific register addresses in the scattered read instruction to the device, and one of these addresses may contain the ID code for the device, assuming the device is listed in the device list. If the device (node) under consideration receives the scattered read instruction from the central computer system, and if the device supports a scattered read operation, the device will send back the data in the addresses specified in the scattered read instruction, resulting in a successful scattered read operation (204). If the device under consideration receives the scattered read instruction but does not support such an operation, the device will report an "illegal function" exception to the central computer system, indicating that the scattered read operation was unsuccessful (204).

If the attempted scattered read failed (204), the algorithm 102 attempts to block read a block of registers in the device under consideration (206). A block read differs from a scattered read in that a block read operation specifies a block of consecutive memory addresses from which data is requested to be read. Here, the algorithm 102 consults Table 1 to determine starting addresses for the block read operations. The algorithm 102 sets the number of register addresses to be read in the block read operation, such as ten, but the number must be set high enough such that at least two device types will be identified in the block read. For example, setting the block size to ten will cause both Enercept and Scout device types to be identified in one block read because their ID codes are 6 addresses apart, but will not cause both ION6200 and Scout device types to be identified in one block read because their ID codes are 23 addresses apart. Increasing the block size to 24 will allow Enercept, Scout, and ION6200 device types to be identified. The selection of the number is a tradeoff between speed and number of block read operations. For example, if the block size is set to three, numerous block read operations may be necessary to check all potential device ID code addresses. On the other hand, if the block size is set to fifty, while only one block read operation may be needed to check all potential addresses, the device will be needlessly tying up the serial communication bus while it communicates fifty 16-bit values to the central computer system 104, slowing down traffic and increasing congestion. Generally, the block size is set to an optimum size that has the potential to identify the most number of devices set forth in Table 1 in one block read operation. Block sizes may differ depending upon their starting addresses. For example, for a starting address of 64648, the block size may be set to two because there is only one other address, 64649, within the maximum block size (125 in this example) supported by the block read operation that also contains another identification code. Here, setting the block size to any number larger than two would be highly inefficient because there are no other addresses higher than 64649 that contain an identification code for any device listed in Table 1. Likewise, for starting address 13, the block size would be set to 24 so that up to three device types may be scanned for in one block read. Setting the block size of 24 any higher for this starting address of 13 would be inefficient because the next address containing an ID code is 515.

The algorithm 102 may try one or more block read operations using different starting addresses to ensure that all potential device ID code addresses are checked for all potential devices in the utility monitoring system 100. Optionally, the algorithm 102 may receive inputs from the end-user specifying which device types are present in the utility monitoring system 100, and if a particular device type is not present in the utility monitoring system 100, the algorithm 102 will simply not try to read from the register address associated with that device type and will adjust the starting addresses and block size of the scattered read and block read operations accordingly.

If the device under consideration receives a block read instruction from the central computer system 104, and if the device supports a block read operation, the device will communicate the data values from the addresses specified in the block read instruction. The algorithm 102 checks the values from the specific addresses in Table 1 known to contain a device ID code and determines whether any of those specific values corresponds to a valid device ID code in Table 1. If so, the block read operation was successful. Otherwise, if the block read operation failed to identify a match, the algorithm 102 may attempt another block read operation using a different starting address until all potential blocks of memory have been checked. If the scattered read and block read operations both fail (208), the algorithm 102 resorts to the slower and less efficient process of reading, one at a time, each register address listed in Table 1 and checking each data value in each register against the device ID codes in Table 1 (210). For example, some legacy devices in the utility monitoring system 100 may not support either scattered reads or block reads, and the register memory address that potentially contains the device ID code in these devices will be checked one at a time by the algorithm 102. By way another example, some devices may have reserved registers in their memory address, causing the block read operation to fail. Some devices may store a predetermined value in their reserved registers, such as −32768, and these reserved registers may be scattered throughout the device's register map. The algorithm 102 may optionally be programmed to recognize this predetermined value responsive to a successful read from the device and continue attempting to scatter or block read from the device's registers. However, if the device does not store any predetermined values in reserved registers and the algorithm 102 attempts to read from one of the reserved registers, the device will send an exception response. In such case, the algorithm 102 may optionally be programmed with a list of common reserved register addresses, and can read around these reserved registers when an exception is received.

When an attempted read operation is successful (e.g., no exception or error is returned), the algorithm 102 checks whether the central computer system 104 received a valid response from the device under consideration (212). A valid response may include the data value(s) in the requested address location(s) of the device's register memory. Initially, a valid response may include a data value for a first address indicated by the scattered read or block read instructions. If the response from the device under consideration is valid, the algorithm 102 determines whether one of the data values returned from the device corresponds to a device ID code in Table 1 (214). If so, the algorithm 102 optionally reprioritizes a scan priority list (216). A scan priority list includes a list of device types that the algorithm should check for first. This scan priority list may be initialized to include most commonly used device types in a utility monitoring system first, and then it is reorganized as the algorithm 102 learns about previously identified devices in the utility monitoring system. For example, if the algorithm 102 begins to learn that there are a number of circuit monitor devices of the same type in the utility monitoring system, it may place that circuit monitor device type at the top of the scan priority list.

Additionally or alternatively, the algorithm 102 may use statistical probabilities based on the frequency of occurrence of certain device types as the learned database is built to organize the device types into a list of the most probable to the least probable. In this way, the algorithm 102 can run even more efficiently by "predicting" what the next device type will be (e.g., assuming that the next device type will be the same as the last one learned or that the next device type will be the one listed as most probable in the scan priority list or that certain device types will typically be used together), so that there is a higher probability algorithm 102 will determine the device ID code on the first scattered read or block read attempted on that device. By way of another example, the algorithm 102 may rank devices according to how prevalent they will likely appear in the utility monitoring system 100. For example, more costly devices, such as the CM4000 circuit monitor will be found less frequently in common monitoring systems as compared to less costly devices, such as a Scout power meter. Thus, if the algorithm 102 learns that a CM4000 circuit monitor is present in the utility monitoring system 100, the algorithm 102 may check for other device types first on the next successful read operation on an unknown device instead of checking for a CM4000 device type.

Returning to block (212), if a valid response is not received, either from the device under consideration or from the communications driver in the central computer system 104, the algorithm 102 determines whether the response is an exception or error (222). There are at least three exception or error types that the algorithm 102 recognizes. An illegal data address exception is returned by the device when an attempt has been made to read an address in a register of the device under consideration that is out of range, is reserved, does not exist, or is otherwise inaccessible (232). An illegal function exception is returned by the device when the requested function is not one supported by the device, such as a scattered read or a block read operation.

A timeout exception or error is returned by the communications driver in the central computer system 104 when the driver has not received any response from the device under consideration within a timeout period. The timeout period is device specific and may be configured to be shorter for certain devices, such as a half second for a CM4000 circuit monitor 114, but longer for other devices, such as several seconds for a Micrologic® trip unit 122. A timeout may occur due to device mis-operation or failure, network congestion, when the device is too busy to service the requested operation from the central computer system 104, or when the device does not recognize communications formatted according to the Modbus protocol, such as the printer 126 and the computer 128. When the response is a timeout exception or error (224), the algorithm 102 flags that device with a flag (226) for a later read attempt. Thus, instead of retrying to communicate with the device for which a timeout is reported, the algorithm 102 will move on to scan for other devices (230) and return to the timed-out device at a later time, either when the scan is completed or when network congestion is lighter. When ready to retry a read attempt on the device, the algorithm 102 checks for device addresses that have been flagged previously, and will reattempt to read those devices' registers.

Returning to block (222), if the exception type is an illegal data address (232), the central computer system 104 is trying to access a memory address in the register memory of the device under consideration that does not exist (e.g., is out of range), is reserved, or is otherwise inaccessible (e.g., access is denied). Accordingly, if the address is out of range, the algorithm 102 deletes any pending register addresses still to be checked for the device under consideration that are higher than the current register address (234), assuming that if the current register address produces an illegal data address exception, then subsequent register addresses will also produce the same exception. By removing from consideration subsequent addresses that will likely produce the same exception, the algorithm 102 avoids needlessly wasting time running additional scattered, block, or per-register reads on higher addresses. If the address is inaccessible, the algorithm 102 will skip that address and try to read from the next address specified in the block or scattered read operation. The algorithm 102 proceeds to block (218), which is described next.

If the response (212) does not include an exception or error (222), the algorithm 102 determines whether there are more registers to be checked (218). For example, if the device supports a block read, and the algorithm 102 has set a block size of ten, then the algorithm 102 reads the next value from the next register address location in the block (220). If the device supports a scattered read, and the algorithm 102 still has additional values in the addresses identified in scattered read operation to read, then the algorithm 102 reads the next value from that next address location (220). If the device supports neither block read or scattered read, the algorithm 102 increments the register address to be read and attempts to read the next register (220). In the latter case, the algorithm 102 continues to read the next address in Table 1 that falls within the block or scattered read operation for the device under consideration until either an illegal data address exception is reported or until a match for the device ID code for the device under consideration is found upon consulting Table 1 or until the algorithm 102 reaches the highest address in Table 1 (e.g., address 64649) without finding any match.

Blocks (216), (218), and (226) proceed to block (228) as shown. In block (228), the algorithm 102 determines whether there are additional devices in the utility monitoring system to scan to ascertain their identities by scanning their communications registers (e.g., IP addresses) based on a table of IP addresses accessible to the algorithm 102 (228). If so, the algorithm 102 prepares to scan the next device (230) and returns to block (202).

Note that as devices are added to the utility monitoring system 100, the end-user runs an auto-detect on the new device's IP address to add the new device to the utility monitoring system 100. Alternatively, the algorithm 102 may automatically ping for any new devices that have been added to the utility monitoring system. In the case of IP addresses, the algorithm 102 may periodically scan the last octet of the IPv4 or IPv6 address to determine whether any new devices have been added. Once a new IP address is recognized, the algorithm 102 runs to learn that device's identity.

Any of these algorithms include machine readable instructions for execution by: (a) a processor, (b) a controller, and/or (c) any other suitable processing device. It will be readily understood that the central computer system 104 includes such a suitable processing device. Any algorithm disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine readable instructions represented in any flowchart depicted herein may be implemented manually. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of determining identities of a plurality of devices of a plurality of different types, including a first device and a second device, which communicate with a central computer system in a utility monitoring system, the method comprising:
    attempting a first scattered read from a plurality of memory addresses of a memory in the first device the memory of the first device arranged according to a first register layout configuration and storing first identification information indicative of (a) the identity of the first device and (b) a type of the first device;
    attempting a second scattered read from a plurality of memory addresses of a memory of the second device, the memory of the second device arranged according to a second register layout configuration different than that of the first register layout configuration and storing second identification information indicative of (a) the identity of the second device and (b) a type of the second device different than that of the type of the first device, the second device being linked together with the first device in the utility monitoring system;
    receiving at the central computer system a response from the first attempted scattered read of the first device;
    determining whether the response is valid;
    if the response is valid, determining whether any of the plurality of memory addresses of the first device includes the first identification information indicative of an identity of the first device and, if so, storing the first identification information associated with the first device in the central computer system; and
    if the response is not valid:
        (a) attempting to block read from a block of memory addresses of the memory of the first device,
        (b) determining whether the block of memory addresses includes the first identification information,
        (c) if the block of memory addresses includes the first identification information, storing the first identification information in the central computer system, and
        (d) if the block of memory addresses does not include the first identification information,
        reading from the memory of the first device in seriatim until the first identification information is read and then storing the first identification information in the central computer system.

2. The method of claim 1, wherein at least some of the plurality of devices communicate data according to a Modbus TCP/IP protocol.

3. The method of claim 1, wherein the central computer system communicates with the first device according to an Ethernet protocol, wherein the utility monitoring system is a power monitoring system, and wherein at least some of the plurality of devices include at least one of power meters, circuit monitors, or trip units.

4. The method of claim 3, wherein the utility monitoring system includes a gateway for converting between the Modbus TCP/IP protocol and the Ethernet protocol.

5. The method of claim 1, the method further comprising:
    responsive to determining that the response is an illegal data address exception, storing in the central computer system a list of memory addresses to read and
    determining which memory address of the memory of the first device caused the illegal data address exception, and, responsive thereto, removing all memory addresses higher than the memory address that caused the illegal data address exception from the list of the memory addresses.

6. The method of claim 1, further comprising adjusting the plurality of addresses to be attempted to be read from a subsequent device in the utility monitoring system such that the adjusted plurality of addresses includes the address of the memory of the first device in which the first identification information is stored.

7. The method of claim 1, responsive to the response being a timeout, further comprising:
    flagging the first device with a flag;
    reattempting to read from the first device; and
    responsive to the storing the first identification information, clearing the flag associated with the first device.

8. The method of claim 1, further comprising:
    providing a scan priority list identifying addresses of memory locations associated with different device types of the plurality of devices; and
    responsive to the storing the first identification information, reprioritizing the scan priority list such that the address of the memory location associated with the first device has a higher position in the scan priority list.

9. A computer program product including one or more non-transitory computer-usable medium or media having a computer-readable logic code embodied therein, said computer-readable logic code adapted to be executed to implement a method for automatically discovering a utility monitoring system including a plurality of devices of a plurality of different types in communication with a remote central computer system, the method comprising:
    attempting a first scattered read, in a single operation and by the central computer system, from a plurality of addresses of a memory arranged according to a first register layout configuration in a first device operable to measure a characteristic of a utility being monitored by a utility monitoring system, the memory of the first device storing first identification information indicative of (a) the identity of the first device and (b) a type of the first device;

attempting a second scattered read, in a single operation, from a plurality of memory addresses of a memory of a second device linked with the first device in the utility monitoring system, the memory of the second device arranged according to a second register layout configuration different than that of the first register layout configuration and storing second identification information indicative of (a) the identity of the second device and (b) a type of the second device different than that of the type of the first device;

receiving at the central computer system a response from the first attempted scattered read of the first device;

determining by the central computer system whether the received response is valid;

responsive to the received response being valid, determining by the central computer system whether any of the plurality of memory addresses of the first device includes the first identification information and if so, storing the first identification information in the central computer system; and if the response is not valid, (a) attempting to block read from a block of memory addresses of the memory of the first device, (b) determining whether the block of memory addresses includes the first identification information, (c) if the block of memory addresses includes the first identification information, storing the first identification information in the central computer system, and (d) if the block of memory addresses does not include the first identification information, reading from a starting address of the memory of the first device in seriatim until the first the first identification information is read and then storing the first identification information in the central computer system.

* * * * *

UNITED STATES PATENT AND TRADEMARK OFFICE
CERTIFICATE OF CORRECTION

PATENT NO.        : 8,150,950 B2
APPLICATION NO.   : 12/152255
DATED             : April 3, 2012
INVENTOR(S)       : Jayme McQuillan et al.

It is certified that error appears in the above-identified patent and that said Letters Patent is hereby corrected as shown below:

In Column 12, Claim 9, please replace Line 17 with the following:

--seriatim until the first identification information--

Signed and Sealed this
Twenty-ninth Day of May, 2012

David J. Kappos
*Director of the United States Patent and Trademark Office*